April 24, 1945.　　　E. P. WORTHEN　　　2,374,519
APPARATUS FOR EVAPORATING AND DISTILLING
Filed April 30, 1942　　　3 Sheets-Sheet 1

Inventor
Eugene P. Worthen,
By R. S. C. Dougherty
Attorney

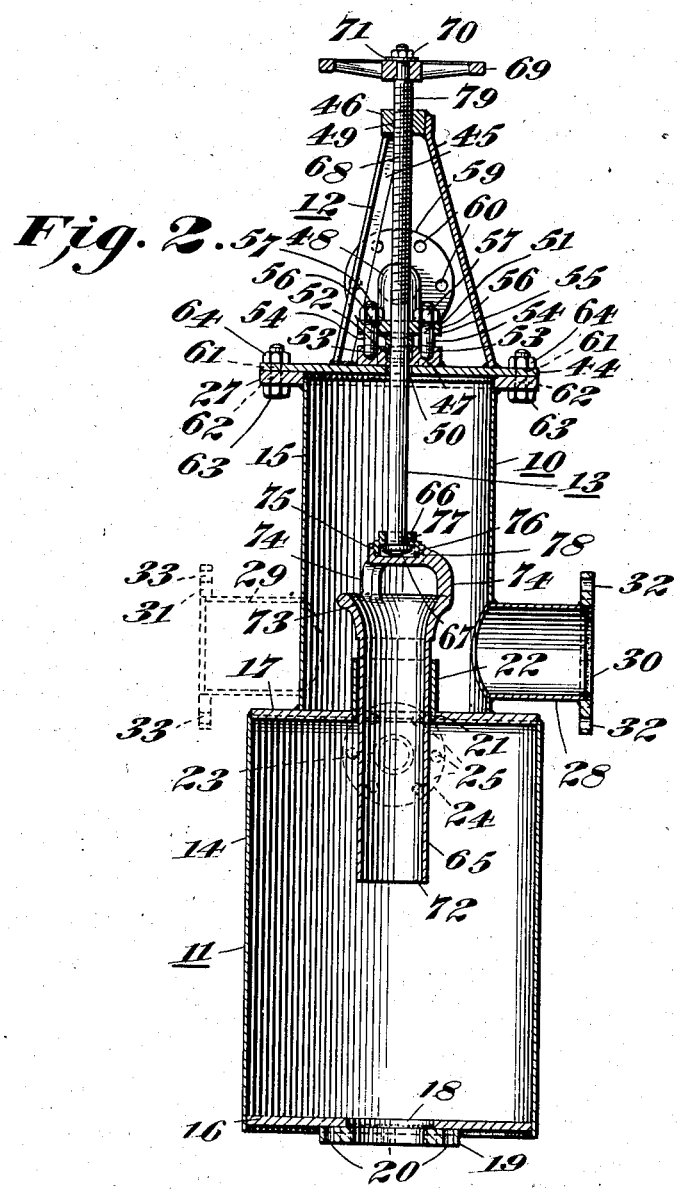

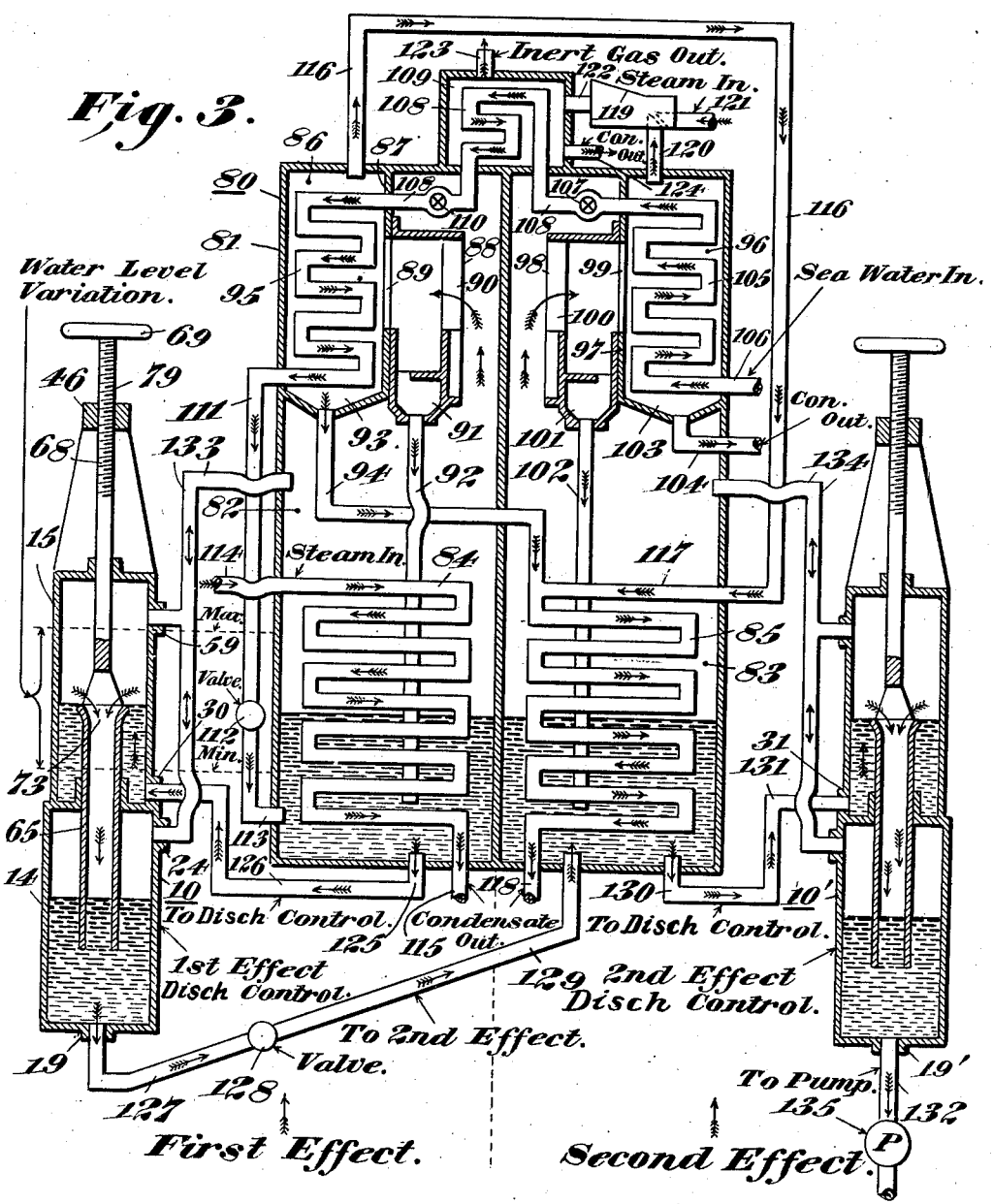

Patented Apr. 24, 1945

2,374,519

UNITED STATES PATENT OFFICE 2,374,519

APPARATUS FOR EVAPORATING AND DISTILLING

Eugene Porter Worthen, East Weymouth, Mass., assignor, by mesne assignments, to Buena Vista Iron Company, a corporation of New Jersey Application April 30, 1942, Serial No. 441,184

8 Claims. (Cl. 202—174)

This invention relates to an improved apparatus for evaporating and distilling, and especially to such apparatus as is intended for use on board ships and the like where it is necessary to supply the fresh or pure water demands from sea water. Such demands are occasioned by the losses of fresh water occurring due to the operation of the ship's machinery, such as condenser, turbine, boiler, auxiliary engines, and the like, together with the ship's human needs, such as drinking water.

The invention relates more particularly to changes and improvements in the feed control means and to changes involving greater simplicity in the method of operation of the apparatus shown and described in Letters Patent of the United States, No. Re. 21,129 granted to Benjamin Fox et al. June 27, 1939.

The control of the feeding for plural effect distilling plants is usually accomplished by varying the quantity of feed entering each effect as required in order to keep the level therein at a predetermined height. This has been done either by means of manually operated valves or by means of float operated valves. In the above named Letters Patent there is shown and described the float operated valve type of feed control—the said valves being in the inlet piping of each effect. The use of such float operated valves in the feed control has not been entirely satisfactory in service due to the tendency for salt to accumulate on the valve seats and thereby cause sticking of the valves.

Accordingly, the main object of my invention is to provide in a water evaporating and distilling apparatus the means for controlling the feed thereof that will not be liable to impairment by its normal operation. With this thought in mind I have provided after considerable experimentation and development work a selective-level, feed control device placed in the outlet piping of each effect, and auxiliary thereto I have provided a manually operated valve in the inlet piping of each effect.

With my design of level controller, the level of the distilland in each effect is maintained by the level of the distilland discharge of that effect rather than by the control of the inlet feed water. Such a change in the fundamental method of control provides as an inherent characteristic of the design that the distilland level in each effect will be maintained within close limits regardless of the quantity fed to the apparatus. This permits, of course, of a continuous flow of distilland in substantial excess of that removed by evaporation in the apparatus to be passed through the apparatus which may vary in quantity without affecting the distilland level within the apparatus.

The adjustable feature of my arrangement of control allows the operator of the apparatus to select or to change the depth of immersion of the heater tubes within the distilland without affecting the feed flow. Conversely, of course, as explained above, the operator may change the feed flow without affecting the depth of immersion of the heater tubes.

Furthermore, my arrangement of control provides additional advantages of operation. With my method of feeding Rotameters or some equivalent flow measuring device may be used to provide instantaneous reading of feed and fresh water. These measurements enable the feed inlet valve to be set manually so as to give approximately the right ratio of feed to fresh water for the brine density desired in the second effect.

It is a further object, therefore, of my invention to provide a feed control means for an apparatus for the evaporating and distilling of water of the type shown and disclosed in said Letters Patent No. Re. 21,129, which means in itself is simple of design and free of operating difficulties, and which permits of a method of operation of said apparatus that combines added simplicity with increased efficiency thereof.

Other objects and advantages will be apparent from the following description, wherein reference is made to the accompanying drawings illustrating the preferred embodiment of my invention and wherein similar reference numerals designate similar parts throughout the several views.

Fig. 2 is a section taken along the lines 2—2 of Figure 1 viewed in the direction of the arrows;

Fig. 3 is a drawing representing in diagrammatic form the flow system of the liquids to be distilled, the heating fluids therefor, and the condensate collecting means in an evaporating and distilling apparatus embodying my invention.

Figure 1:
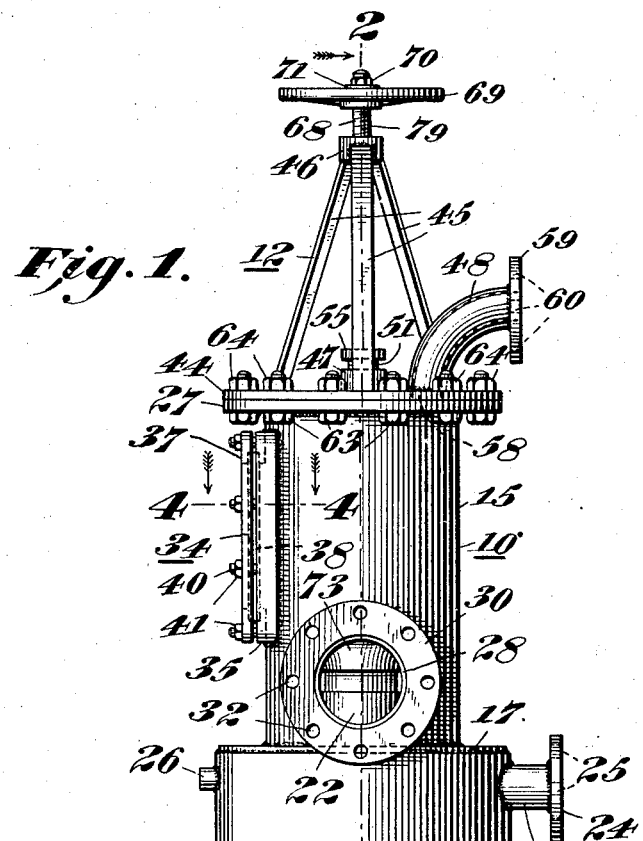
Figure 1 is a side elevation of the control unit.

Referring now to Figures 1 and 2 of the drawings, the numeral 10 designates the control unit which comprises the container body 11, removable cover 12, and adjustable discharge pipe 13.

Figure 4:
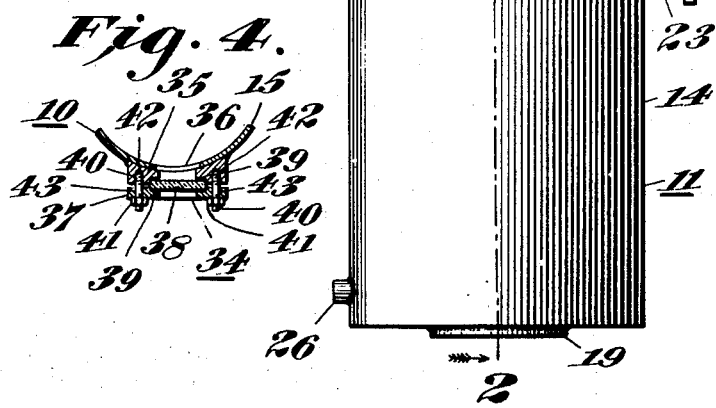
Fig. 4 is a section taken along the line 4—4 of Figure 1 viewed in the direction of the arrows.

The container body 11 may be a casting but is preferably constructed, as indicated in Figures 1 and 2, of welded steel elements. As shown the container body 11 comprises a lower cylindrical shell 14, and an upper cylindrical shell 15. Shell 14 has welded integrally therewith bottom plate 16, and top plate 17. Bottom plate 16 has central outlet orifice 18 and welded outlet flange connection 19 provided with tapped stud holes 20. Top plate 17 has a central opening 21 and extending upwardly therefrom and welded to the plate at the periphery of the opening is bearing 22. Near the top and at the rear of the shell 14 is a welded outlet connection 23 and welded flange 24 provided with bolt holes 25. In front near the bottom and near the top of the shell 14 are provided welded bosses 26 which may be suitably machined for the attachment of gage glass fittings not shown. Shell 15 is welded integrally to the top plate 17 and comprises a flange 27 welded to its upper end and a welded flange outlet 28 near its bottom end at the right side for first effect control unit 10 as indicated in Figure 3. For second effect control unit 10' the outlet is placed on the left side as indicated by dotted lines 29 in Figure 2. The outlets 28 and 29 have respectively welded flanges 30 and 31 provided with suitable attachment bolt holes 32 and 33. On the front of the shell 15 is provided a sight glass 34 for observing the interior thereof. As shown in Figures 1 and 4 the sight glass 34 comprises a holding frame 35 welded to the shell 15 over an opening 36 therein, clamp frame 37, glass window 38, packing elements 39, and attachment studs 40 with nuts 41. The holding frame 35 is provided with tapped holes 42, and the clamp frame 37 with clearance holes 43—both for the accommodation of the attachment studs 40.

The removable cover 12 is a welded unit which comprises cover plate 44, tripod legs 45, nut 46, stuffing-box 47, and outlet elbow connection 48. The tripod legs 45 are welded at their lower ends to the cover plate 44, and at their upper ends are welded to the nut 46. Nut 46 is machined with an internal screw thread 49 to engage the threaded rod 68 described hereinafter. The stuffing-box 47 is welded to the cover plate 44 over an opening 50 therein, and is provided with a lower central bore of a size to be a clearance fit over the rod 68, an upper counterbore adapted to receive a stuffing-box gland follower 51 and packing 52, and tapped holes 53 adapted to receive studs 54. A stuffing-box gland 55 has clearance holes 56 for the studs 54 in register with the tapped holes 53. The stuffing-box gland 55 and follower 51 are adapted to have a sliding fit on the rod 68. Nuts 57 on the studs 54 act to hold the gland 55, follower 51, and packing 52 in operable relation with the stuffing-box 47. The outlet elbow connection 48 is welded to the rear half of the cover plate 44 over an opening 58 therein and has welded on its outer end the flange 59 provided with bolt holes 60. The flange 59 is in parallel relation to the flange 24 on the outlet connection 23 below in the lower shell 14.

The cover 12 is removably attached to the container body 11 by reason of the provision of bolt holes 61 in the cover plate 44 in register with bolt holes 62 in the flange 27 of shell 15. The attaching means are, as shown, bolts 63 and nuts 64.

The adjustable discharge pipe 13 comprises the discharge pipe 65, bearing 66, retaining nut 67, rod 68, operating handle 69, nut 70, and retaining washer 71. The weir 65 is preferably a casting having a tube body 72 machined to have a sliding fit in the bearing 22 and having a flared bell-mouth 73 on its upper end. Integral with the periphery of the bell-mouth 73 are supporting legs 74, and stem support 75, which provide openings outwardly over the lip of the bell-mouth 73. The stem support 75 has a tapped recess 76 to receive the bearing 66. The bearing 66 is a cylindrical threaded plug adapted to engage the threaded recess 76 and is provided with a bore 77, and counter-bore 78. The rod 68 is provided on its lower end with retaining nut 67 threaded and riveted or otherwise attached thereto. The rod 68 and retaining nut 67 are adapted for a rotating fit in the bore 77 and counter-bore 78 respectively of the bearing 66. The rod 68 is provided along its upper half with a screw thread 79 adapted to engage with the nut 46, and on its upper end is adapted for keyed engagement with the operating handle 69 and is threaded to receive the nut 70.

I now refer to Figure 3 wherein I have shown in diagrammatic form my control device embodied in a modified apparatus of the type hereinbefore referred to, and which in its original form is shown and described in detail in the Letters Patent of the United States No. Re. 21,129.

In Figure 3 the numeral 80 designates the evaporating and distilling apparatus unit. This unit 80 comprises the container shell 81 for the body of sea water to be evaporated and distilled, and also acts as the mounting for the various units required to accomplish the said evaporation and distillation. The container shell 81 is divided into two compartments or chambers, the left hand one of which as viewed in Figure 3 I designate as the first effect evaporator chamber 82; and the right hand one we have designated as the second effect evaporator chamber 83. Further sub-division of these chambers will be hereinafter described.

Contained within the lower halves of the first effect evaporator chamber 82 and of the second effect evaporator chamber 83 are the first effect heated 84 and the second effect heater 85.

Within the first effect evaporator chamber 82 at the top thereof is the vapor feed heater chamber 86. Supported on an inner wall 87 of the chamber 86 is the first effect vapor separator 88. The vapor feed heater chamber 86 communicates with the first effect evaporator chamber 82 through an orifice 89 in the wall 87 and through the separator 88 as indicated by arrows at the inlet entrance 90 to the separator 88. The separator 88 comprises a drain chamber 91 and a discharge conduit 92 extending downwardly to the lower part of the chamber 82. The feed heater chamber 86 comprises a drain space 93 and a discharge conduit 94 to be hereinafter more fully described. Contained within the vapor feed heater chamber 86 is the first effect vapor feed heater 95.

Within the second effect evaporator chamber 83 at the top thereof is the distilling condenser chamber 96. Supported on an inner wall 97 of the chamber 96 is the second effect vapor separator 98. The distilling condenser chamber 96 communicates with the second effect evaporator chamber 83 through an orifice 99 in the wall 97 and through the separator 98 as indicated by arrows at the inlet entrance 100 to the separator 98. The separator 98 comprises a drain chamber 101 and a discharge conduit 102 extending downwardly to the lower part of the chamber 83. The distilling condenser chamber 96 comprises a drain space 103 and a discharge conduit 104 to be hereinafter more fully described. Contained within the distilling condenser chamber 96 is the distilling condenser 105.

The distilling condenser 105 comprises a conduit having as an inlet 106 for sea water that is to be evaporated and distilled and which conduit continues on through the distilling condenser chamber 96 as the condenser 105 to comprise a branch outlet connection conduit 107 and a continuing connection conduit 108. Forming a part of the apparatus 80 is the air ejector condenser chamber 109. The conduit 108 passes through the chamber 109 as a heat exchange means therein and continues on as a conduit to comprise a branch outlet connection conduit 110 just outside the vapor feed heater chamber 86. The first effect vapor feed heater 95 comprises a conduit having as an inlet the continuing conduit 108 and which conduit continues on through the vapor feed heater chamber 86 as the first effect vapor feed heater 95 to an outlet conduit 111. The conduit 111 comprises a stop-valve 112 and a discharge connection 113 into the bottom of the first effect evaporator chamber 82.

The first effect heater 84 comprises a conduit having an inlet 114 for steam and which conduit continues on through the lower half of the first effect evaporator chamber 82 as the heater 84 to an outlet connection 115.

Communicating with the interior of the vapor feed heater chamber 86 is outlet conduit 116 which continues on as an exterior conduit to enter the second effect evaporator chamber 83 as the inlet connection 117 to the second effect heater 85.

The second effect heater 85 is also communicated with the drain space 93 by means of the discharge conduit 94 as an inlet and after continuing on through the lower half of the second effect evaporator chamber 83 it leaves the bottom thereof as an outlet conduit 118.

Air ejector 119 communicates with the top of the distilling condenser chamber 96 by means of conduit 120, and is supplied with operating steam through conduit 121. The air ejector 119 discharges to the air ejector condenser chamber 109 through conduit 122. The air ejector condenser chamber 109 communicates with the atmosphere by means of outlet conduit 123, and is provided with a drain conduit 124.

Outlet conduit connection 125 in the bottom of the first effect evaporator chamber 82 communicates with the inlet flange connection 30 of the first effect control unit 10 by means of outlet conduit 126. The discharge connection 19 of the first effect control unit 10 communicates with the bottom of the second effect evaporator chamber 83 through outlet conduit 127, valve 128, and conduit 129.

Outlet conduit connection 130 in the bottom of the second effect evaporator chamber 83 communicates with the inlet flange connection 31 of the second effect control unit 10' by means of outlet conduit 131. The discharge connection 19' of the second effect control unit 10' communicates with a pump 135 through outlet conduit 132.

The flange connections 24 and 59 of the first effect control unit 10 are communicated with the interior of the first effect evaporator chamber 82 by means of the conduit 133. The second effect control 10' is similarly communicated with the interior of the second effect evaporator chamber 83 by means of the conduit 134.

I will now describe the operation of my improved apparatus for evaporating and distilling sea water as used on board ships. Water is pumped from the sea chest to the distilling condenser 105 by way of the conduit 106. After passing through the circulating conduit of the distilling condenser 105, where it serves its function as a cooling agent, a large part of the water is automatically deflected through the outlet conduit 107 to be discharged overboard, while the remainder required for distilling purposes circulates through the circulating conduit 108 of the air ejector condenser chamber 109. Between the air ejector condenser chamber 109 and the vapor feed heater chamber 86 a branch outlet conduit 110 is provided in the conduit 108 to provide for an emergency discharge overboard. The conduit 108 becomes the circulating conduit of the first effect vapor feed heater 95 in the chamber 86 and passing therefrom as outlet conduit 111 continues exteriorly of the apparatus 80. A stop valve 112 communicates the conduit 111 with the conduit 113 through which the distilling water is discharged into the bottom of the first effect evaporating chamber 82 where it becomes the distilland thereof.

In the passage of the distilling water as just described heat has been accumulated therein from the distilling condenser chamber 96, the air ejector condenser chamber 109, and the vapor feed heater chamber 86. At the same time exhaust steam from the ship's auxiliaries is flowing into the inlet conduit 114 to and through the circulating conduit of the first effect heater 84, and discharges as condensate through the outlet conduit 115 to the ship's drain tank (not shown).

The exhaust steam flowing through the heater 84 is sufficient to vaporize a portion of the distilland within the chamber 82. As the vapor rises from the surface of the distilland in chamber 82 it passes to the top thereof and enters the first effect vapor separator 88. Passing through the separator 88, the entrained water in the vapor is extracted and returned to the main body of the distilland below. A portion of the entrained water drops from the face of the separator 88 to the distilland below, while the balance extracted by the separator 88 is returned to the distilland below beneath its surface by means of the discharge conduit 92. The dried vapor passes on to the vapor feed heater chamber 86 and flows over and around the circulating conduit of the heater 85 thus heating the flowing distilling water therein. The condensate formed from the vapor during this heating of the distilling water is collected in the drain space 93 and is discharged therefrom through the discharge conduit 94 to the second effect heater 85. The dried vapor meanwhile flows outward from the chamber 86 through the conduit 116, to and through the circulating conduit of second effect heater 85, and forming condensate therein joins with the condensate received through conduit 94 from the vapor feed heater chamber 86 and both are discharged for use as fresh water through the outlet conduit 118.

I now describe the specific feature of my invention in the method of operation of this evaporating and distilling apparatus that results from the embodiment therein of my control device. As has hereinbefore been described the control of the feeding for plural effect distilling plants is usually accomplished by varying the quantity of feed entering each effect as required to keep the level therein at a predetermined height. This has been done either by means of valves manually operated and requiring careful attention, or by means of float operated valves in the inlet piping of each effect such as is shown and described in the Letters Patent of the United States, No. Re. 21,129. In my arrangement and method of operation the float operated valve on the inlet piping of each effect is eliminated and the level of distilland in each effect is maintained by placing on the outlet piping of each effect one of my control devices, and for auxiliary purposes a stop-valve is placed on the inlet piping of each effect. With my arrangement all the distilling liquid coming from the first effect heater 95 is passed through the apparatus in a constant flow without disturbing the height of level of the distilland as selected by the operator for each effect, and this selected height of level may be raised or lowered as desired without affecting the flow, or if desired the rate of flow may be modified without affecting the height of level selected. These several advantages are obtained by the use of my control device 10 hereinbefore described. Its incorporation into the evaporating and distilling apparatus is as follows: From the description of my control device as hereinbefore described it is apparent that the range of distilland level control within each effect is determined by the range of up-and-down movement of the bell-mouth 73 of the discharge pipe 65 available in the device as manufactured. This range has been indicated on the drawing Figure 3 as maximum and minimum water level variation. With this knowledge the control devices 10 and 10' are so mounted upon the apparatus 80 as to best utilize this range of distilland variation with respect to the heaters 84 and 85, respectively. When so mounted it is then apparent that positioning of the discharge pipe 65 in each device by means of the handles 69 determines the level of distilland that will prevail in the effect with which the particular control device when manipulated is associated.

The conduits 133 and 134 which communicate respectively the evaporator chambers 82 and 83 with the tops of the chambers 14 and 15 of their respective control device assures that the said chambers will be in vapor balance one with each other in their respective effects. By reason of this balance of pressure the distilling water flowing into the first effect evaporator chamber 82 from the discharge conduit 113 will simultaneously maintain the same height of level of distilland in the chamber 15 of the control device 10 and in the evaporator chamber 82 by reason of their intercommunication through the conduits 125 and 126. The distilland will rise in each of these chambers 82 and 15 to the height at which the bell-mouth 73 of the discharge pipe 65 is adjusted by the handle 69, at which point the level of the distilland is maintained by the excess liquid fed into the chamber 82 flowing constantly over the bell-mouth 73 and discharging into the chamber 14. The stop-valve 112 will be set manually to give approximately the right ratio of feed to fresh water for the brine density desired in the second effect. The excess discharge, or blow-down, from the first effect falling into the chamber, or hotwell 14, is maintained at a sufficient height in this hotwell 14 to provide a liquid seal between the two evaporator chambers 82 and 83. This desired height of liquid maintained in hotwell 14 is obtained by manual operation of the stop-valve 128 in the conduit 127—129 communicating the hotwell 14 of the first effect control 10 with the second effect evaporator chamber 83. Due to the large volume of the hotwell 14 and to the fact that the level therein need not be held within small limits, as is the case where the distilland level is maintained from the inlet piping, the stop-valve 128 will require only intermittent adjustment. The level of the distilland in the second effect evaporator chamber is maintained in the same manner as that of the first effect and needs no further explanation. The blow-down from the second effect passes into the hotwell of the second effect control 10' from which the brine pump 135 takes suction. The capacity-head characteristics of the brine pump are such that no manual control is required to maintain a level in this hotwell which functions merely as an element of the discharge line to the pump 135.

From the description just given it will be noted that valve 112 in the feed inlet line to the first effect evaporator chamber 82 is adjusted only to obtain the desired brine density. The valve 128 in the feed inlet line to the second effect evaporator chamber 83 is adjusted only to maintain a water seal between the effects. Neither of these two valves requires close attention as they have no effect on the water levels in the apparatus itself. From recent tests it has been found that the feed valve 112 when once set does not need to be changed for the duration of the run, and it has been found that the valve 128 between effects need be adjusted only at about one-half hour intervals.

I now conclude the description of my method of operation. A portion of the distilland in the second effect evaporator chamber 83 is vaporized by the heat of the vapor from the first effect flowing through the second effect heater 85 as hereinbefore described. The vapor as it rises from the main body of distilland in the chamber 83 passes to the top thereof and enters the second effect separator 98. Passing through the separator 98 the entrained water in the vapor is extracted and returned to the main body of the distilland below. A portion of the entrained water drops from the face of the separator 98 to the distilland below, while the balance extracted by the separator 98 is returned to the distilland below beneath its surface by means of the discharge conduit 102. The dried vapor passes on to the distilling condenser chamber 96 and flows over and around the circulating conduit of the heater 105 thus heating the distilling water therein. The condensate formed from the vapor during the heating of the distilling water is collected in the drain space 103 and is discharged for use therefrom through the discharge conduit 104. The dried vapor meanwhile flows outward from the chamber 96 through the conduit 120 to the air ejector 119. The air ejector is functioned by a steam jet fed from a connection to the auxiliary steam line (not shown) and tends to create a vacuum in the distilling condenser chamber 96 thus acting to draw off the remaining vapor as just described, and also to establish a pressure differential with respect to the first effect evaporator chamber 82, which results in maintaining the feed water pressure flow, and in obtaining low pressure evaporation in the second effect evaporator chamber 83. The air ejector 119 discharges by way of conduit 122 into the air ejector condenser chamber 109, where, in a manner well known to the art, the non-condensing vapors are exhausted to the atmosphere through the outlet conduit 123, and the condensate formed in the chamber 109 is discharged to the ship's drain tank (not shown) through the drain conduit 124.

It will now be apparent that I have devised a novel apparatus for evaporating and distilling, especially applicable to marine purposes but it will be manifest that it is useful and valuable for application to other fields. I have shown that by means of my outlet control I am able to pass through the evaporating and distilling apparatus a large excess of distilland over and above that evaporated by the apparatus, and that this is accomplished while maintaining a narrow margin of variation in the operating height of distilland in the vaporizing chambers. This in turn gives rise to greater ability to obtain very high specific volumes of vapor from a given volume of apparatus shell with a consequent higher standard of purity of product. Also by discharging relatively large fractions of the feed through the blows I am able to operate at low brine densities which reduces scaling with its consequent expenditure of labor and inconvenience to operation.

Although I have described and illustrated my invention in considerable detail, I do not wish to be limited to the exact and specific details thereof as shown and described, but may use such modifications in, substitutions for, or equivalent thereof, as are embraced within the scope of my invention, or as are pointed out in the claims.

Having thus described my invention, what I claim as new and desire to secure by Letters Patent is:

1. A multiple effect evaporating and distilling apparatus, comprising a first compartment and a second compartment within a single container, each of said compartments being adapted to contain a body of liquid separated by a common wall, each of said compartments having a liquid vaporizing portion and a vapor condensing portion, heater means within said first compartment for heating and vaporizing liquid therein, means for conveying feed liquid in pre-heat heat interchanging relationship successively with vapor in the vapor condensating portion of said second compartment and the vapor condensating portion of said first compartment whereby said vapors in both compartments are condensed while preheating said feed liquid, conduit means for conveying feed liquid thus preheated into the liquid vaporizing portion of said first compartment and comprising means to control the operating rate of flow of said feed liquid to said first compartment in constant substantial excess of that removed by evaporation in said apparatus, conduit means for conveying heated liquid from said first compartment into said second compartment and comprising a vertically adjustable discharge pipe having a substantially horizontally disposed discharge orifice of constant area and a hotwell for receiving the excess liquid flow from said first compartment whereby the liquid level in said first compartment may be maintained regardless of the operating rate of liquid flow and a restraining means for said liquid flow, means for conveying vapor from said first compartment into heat interchanging relationship with the liquid in said second compartment for vaporizing liquid therein, means for collecting for use condensate formed in the vapor condensing portion of said second compartment, means for maintaining a vapor pressure differential between the two compartments, a conduit system comprising a vertically adjustable discharge pipe having a substantially horizontally disposed discharge orifice of constant area and a conduit for receiving the excess liquid flow from said second compartment whereby the liquid level in said second compartment may be maintained regardless of the operating rate of liquid flow, and a pump to remove the liquid from the last mentioned conduit.

2. A multiple effect evaporating and distilling apparatus, comprising a first compartment and a second compartment within a single container, each of said compartments being adapted to contain a body of liquid separated by a common wall, each of said compartments having a liquid vaporizing portion and a vapor condensing portion, heater means within said first compartment for heating and vaporizing liquid therein, means for conveying feed liquid in pre-heat heat interchanging relationship successively with vapor in the vapor condensating portion of said second compartment and the vapor condensating portion of said first compartment whereby said vapors in both compartments are condensed while preheating said feed liquid, conduit means for conveying feed liquid thus preheated into the liquid vaporizing portion of said first compartment and comprising means to control the operating rate of flow of said feed liquid to said first compartment in constant substantial excess of that removed by evaporation in said apparatus, conduit means for conveying heated liquid from said first compartment into said second compartment and comprising a vertically adjustable discharge pipe having a substantially horizontally disposed discharge orifice of constant area and a hotwell for receiving the excess liquid flow from said first compartment whereby the liquid level in said first compartment may be selectively changed without affecting the operating rate of liquid flow and a restraining means for said liquid flow, means for conveying vapor from said first compartment into heat interchanging relationship with the liquid in said second compartment for vaporizing liquid therein, means for collecting for use condensate formed in the vapor condensing portion of said second compartment, means for maintaining a vapor pressure differential between the two compartments, a conduit system comprising a vertically adjustable discharge pipe having a substantially horizontally disposed discharge orifice of constant area and a conduit for receiving the excess liquid flow from said second compartment whereby the liquid level in said second compartment may be selectively changed without affecting the operating rate of liquid flow, and a pump to remove the liquid from said conduit.

3. In apparatus for evaporating and distilling a liquid comprising an evaporating compartment, control means for maintaining the level of the liquid within said evaporating compartment regardless of a constant flow of liquid at variable rates of flow in excess of the liquid evaporated within said apparatus comprising a constant flow control means in the feed line entering the apparatus and an outlet conduit system comprising a vertically adjustable discharge pipe having a substantially horizontally disposed discharge orifice of constant area and a conduit for receiving the excess liquid flow from said apparatus, a pump to remove the liquid from said conduit, and a means of restraining the flow between the said vertically adjustable discharge pipe and said pump.

4. In apparatus for evaporating and distilling a liquid comprising an evaporating compartment, control means for selectively changing the level of the liquid within said evaporating compartment without affecting the operating rate of liquid flow comprising a constant excess flow control means in the feed line entering the apparatus and an outlet conduit system comprising a vertically adjustable discharge pipe having a substantially horizontally disposed discharge orifice of constant area and a conduit for receiving the excess liquid flow from said apparatus, a pump to remove the liquid from said conduit, and a means of restraining the flow between the said vertically adjustable discharge pipe and said pump.

5. In a multiple effect apparatus for evaporating and distilling a liquid, a first effect comprising a first evaporating compartment, and a second effect comprising a second evaporating compartment, control means for maintaining the levels of the liquids within said compartments regardless of a constant flow of liquid at variable rates of flow in excess of the liquid evaporated within said apparatus and comprising a constant flow control means in the feed line entering the first evaporating compartment, a conduit system for conducting the excess liquid from the first evaporating compartment to the second evaporating compartment and comprising a vertically adjustable discharge pipe having a substantially horizontally disposed discharge orifice of constant area and a hotwell for receiving the excess liquid flow from said first compartment and a restraining means for said liquid flow, and a conduit system comprising a vertically adjustable discharge pipe having a substantially horizontally disposed discharge orifice of constant area and a conduit for receiving the excess liquid flow from the second compartment and a pump to remove the liquid from the last mentioned conduit.

6. In a multiple effect apparatus for evaporating and distilling a liquid, a first effect comprising a first evaporating compartment, and a second effect comprising a second evaporating compartment, control means for selectively changing the levels of the liquids within said compartments without affecting the operating rate of liquid flow and comprising a constant excess flow control means in the feed line entering the first evaporating compartment, a conduit system for conducting the excess liquid from the first evaporating compartment to the second evaporating compartment and comprising a vertically adjustable discharge pipe having a substantially horizontally disposed discharge orifice of constant area and a hotwell for receiving the excess liquid flow from said first compartment and a restraining means for said liquid flow, and a conduit system comprising a vertically adjustable discharge pipe having a substantially horizontally disposed discharge orifice of constant area and a conduit for receiving the excess liquid flow from the second compartment and a pump to remove the liquid from the last mentioned conduit.

7. An evaporating and distilling apparatus, comprising a single container adapted to contain a body of liquid to be distilled and comprising a vaporizing portion and a vapor condensing portion, heater means within said vaporizing portion for heating and vaporizing liquid therein, conduit means for conveying feed liquid in preheat heat interchanging relationship with vapor in said vapor condensing portion whereby said vapor is condensed while preheating said feed liquid, conduit means for conveying feed liquid thus preheated into said vaporizing portion, and comprising means to control the operating rate of flow of said feed liquid in constant substantial excess of that removed by evaporation in said apparatus, means for collecting for use condensate formed in said vapor condensing portion, vapor exhausting means communicating said vapor condensing portion with the atmosphere, a conduit system comprising a vertically adjustable discharge pipe having a substantially horizontally disposed discharge orifice of constant area and a conduit for receiving the excess liquid flow from said vaporizing portion whereby the liquid level in said vaporizing portion may be maintained regardless of the operating rate of liquid flow, and a pump to remove the liquid from said conduit.

8. An evaporating and distilling apparatus, comprising a single container adapted to contain a body of liquid to be distilled and comprising a vaporizing portion and a vapor condensing portion, heater means within said vaporizing portion for heating and vaporizing liquid therein, conduit means for conveying feed liquid in preheat heat interchanging relationship with vapor in said vapor condensing portion whereby said vapor is condensed while preheating said feed liquid, conduit means for conveying feed liquid thus preheated into said vaporizing portion and comprising means to control the operating rate of flow of said feed liquid in constant substantial excess of that removed by evaporation in said apparatus, means for collecting for use condensate formed in said vapor condensing portion, vapor exhausting means communicating said vapor condensing portion with the atmosphere, a conduit system comprising a vertically adjustable discharge pipe having a substantially horizontally disposed discharge orifice of constant area and a conduit for receiving the excess liquid flow from said vaporizing portion whereby the liquid level in said vaporizing portion may be selectively changed without affecting the operating rate of liquid flow, and a pump to remove the liquid from said conduit.

EUGENE PORTER WORTHEN.